Figure 1:
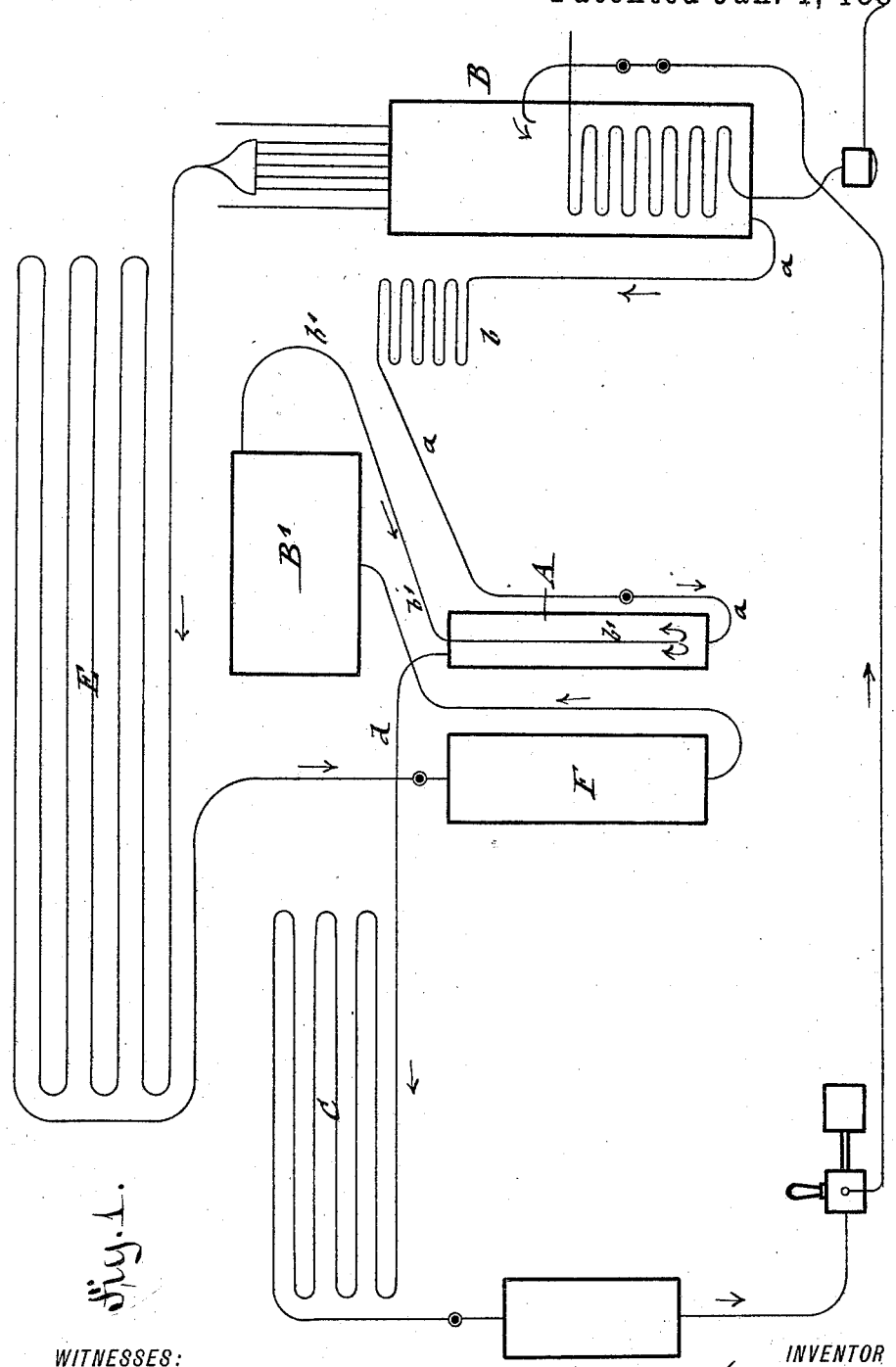

(No Model.) 2 Sheets—Sheet 1.

M. PIEL.
ABSORBER FOR REFRIGERATING MACHINES.

No. 395,512. Patented Jan. 1, 1889.

WITNESSES:
INVENTOR
Michael Piel
BY
ATTORNEYS.

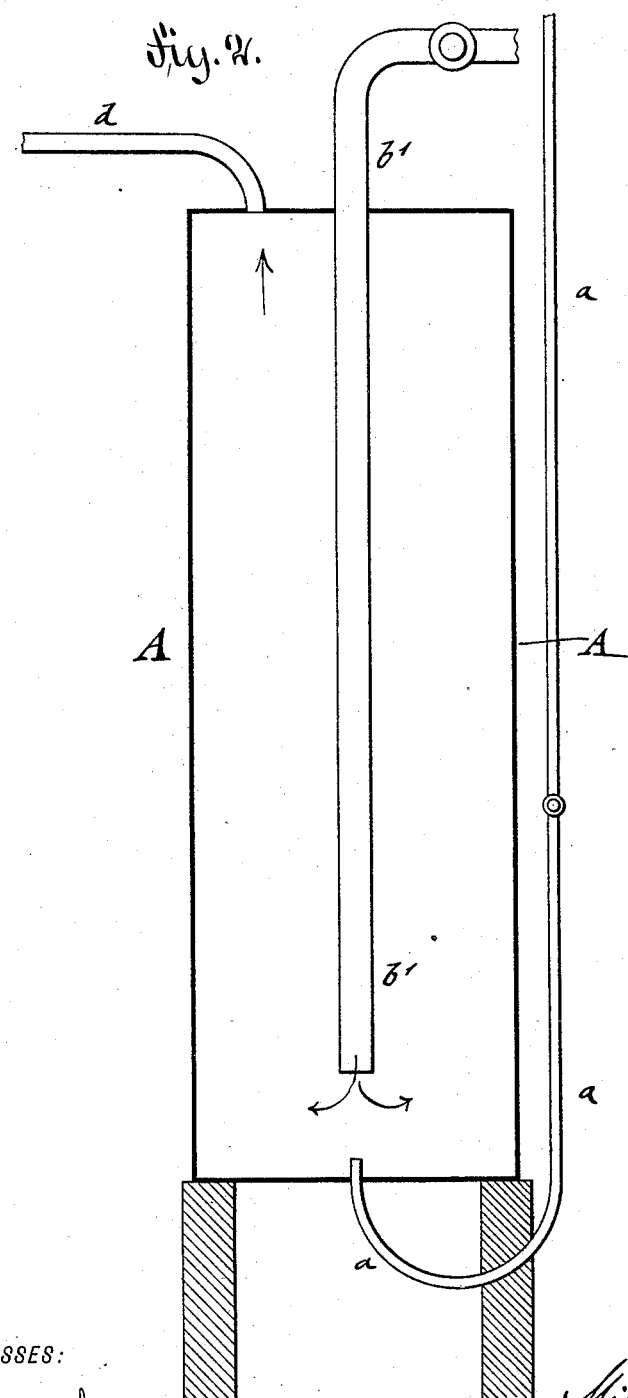

UNITED STATES PATENT OFFICE.

MICHAEL PIEL, OF EAST NEW YORK, ASSIGNOR TO PIEL BROTHERS, OF BROOKLYN, NEW YORK.

ABSORBER FOR REFRIGERATING-MACHINES.

SPECIFICATION forming part of Letters Patent No. 395,512, dated January 1, 1889.

Application filed August 17, 1888. Serial No. 283,032. (No model.)

*To all whom it may concern:*

Be it known that I, MICHAEL PIEL, of East New York, in the county of Kings and State of New York, have invented certain new and useful Improvements in Absorbers for Refrigerating-Machines, of which the following is a specification.

This invention relates to an improved construction of absorber for ammonia refrigerating-machines of that class in which the principle of absorption is employed; and the invention consists of an absorber into which the expanded ammonia-gases are conducted by a central pipe passing from the top downward and discharged near the bottom, so as to mingle with the weak ammonia-water from the still, which is introduced at the bottom of the absorber and then conducted through an exit-pipe at the top to a cooler and return to the still.

In the accompanying drawings, Figure 1 represents a diagram showing the connection of my improved absorber with the remaining parts of an absorption refrigerating-machine, and Fig. 2 is a vertical central section of my improved absorber drawn on a larger scale.

Similar letters of reference indicate corresponding parts.

Referring to the drawings, A represents the cylindrical absorption vessel of an ammonia refrigerating-machine, which absorber is connected at the bottom by a pipe, $a$, with the bottom of the evaporating-still B. The weak ammonia-water is conducted from the still through the pipe $a$ to the absorber A, and cooled on its way by means of a cooling-coil, $b$. The expanded ammonia-gases are conducted from the brine-tank B' by a pipe, $b'$, to the top part of the absorber, said pipe extending downward centrally through the absorber A to near the bottom of the same, so as to discharge the expanded gases near the bottom and cause them to mingle with the weak ammonia-water. The top part of the absorber is further connected by a pipe, $d$, with a cooling-coil, C, and the strong ammonia-tank D, from which strong ammonia-water is reconducted by a pump to the still. In the still the gas is evaporated by a steam-heating coil-heater cooled in a condenser, E, and conducted in liquid form to the receiver F, from which latter it is allowed to expand into a brine-tank, B', in the well-known manner according to the principle invented by Carré.

The advantage of the construction of my aborber consists in the fact that the expanded gases are mixed with the weak ammonia-water at the lower part of the absorber. As the absorption of the gas by the weak ammonia-water generates a certain degree of heat, the ammonia-water becomes lighter and rises to the top of the absorber, so as to subject continually a new quantity of gas to contact with the weak ammonia-water, which quickly absorbs the gas and again rises to the top of the absorber, and so on, so as to promote thereby the upward motion of the water and the continuous reabsorption of the expanded gases by the same.

The special arrangement of the gas and water supply pipes in the absorber forms the essential feature of my invention, and one which has given considerable satisfaction in practice, inasmuch as the quick absorption of the gas and the rise of the strong ammonia-water takes place in a reliable manner, so as to remove thereby all back-pressure on the brine-tank and keep up the supply of strong ammonia-water to the strong ammonia-tank, and of the still, and produce the reliable and economical working of the refrigerating-plant.

Having thus described my invention, I claim as new and desire to secure by Letters Patent—

An absorber for refrigerating-machines, composed of a cylindrical vessel, a gas-induction pipe extending downward through the top of the absorber to near the bottom of the same, a supply-pipe for the weak ammonia-water entering at the bottom of the absorber, and a discharge-pipe connected to the top of the absorber for conducting off the strong ammonia-water, substantially as set forth.

In testimony that I claim the foregoing as my invention I have signed my name in presence of two subscribing witnesses.

MICHAEL PIEL.

Witnesses:
PAUL GOEPEL,
MARTIN PETRY.